US008856570B2

(12) United States Patent
Diab et al.

(10) Patent No.: US 8,856,570 B2
(45) Date of Patent: Oct. 7, 2014

(54) ENERGY EFFICIENCY ETHERNET WITH LOW POWER ACTIVE IDLE TRANSMISSION MODE

(75) Inventors: Wael William Diab, San Francisco, CA (US); Mehmet Tazebay, Irvine, CA (US); Scott Powell, Alisa Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 205 days.

(21) Appl. No.: 13/222,848

(22) Filed: Aug. 31, 2011

(65) Prior Publication Data

US 2013/0054996 A1 Feb. 28, 2013

(51) Int. Cl.
| | |
|---|---|
| *G06F 1/00* | (2006.01) |
| *G06F 1/32* | (2006.01) |
| *H04L 12/40* | (2006.01) |
| *H04L 12/10* | (2006.01) |
| *H04L 12/12* | (2006.01) |

(52) U.S. Cl.
CPC ............... *H04L 12/12* (2013.01); *Y02B 60/34* (2013.01); *H04L 12/40039* (2013.01); *H04L 12/10* (2013.01); *G06F 1/3278* (2013.01); *Y02B 60/32* (2013.01); *Y02B 60/35* (2013.01); *Y02B 60/126* (2013.01)
USPC ............................ 713/323; 713/300; 713/324

(58) Field of Classification Search
USPC ........................................ 713/300, 323, 324
See application file for complete search history.

(56) References Cited

U.S. PATENT DOCUMENTS

| | | | | |
|---|---|---|---|---|
| 8,127,164 | B2 * | 2/2012 | Diab et al. ..................... | 713/324 |
| 2008/0225841 | A1 * | 9/2008 | Conway et al. ............... | 370/389 |
| 2009/0061918 | A1 * | 3/2009 | Emara et al. .................. | 455/522 |
| 2009/0088097 | A1 * | 4/2009 | Carballo .................... | 455/127.1 |
| 2009/0154365 | A1 * | 6/2009 | Diab et al. ..................... | 370/248 |
| 2009/0193109 | A1 * | 7/2009 | Kuo et al. ..................... | 709/223 |
| 2009/0204828 | A1 * | 8/2009 | Diab et al. ..................... | 713/320 |
| 2009/0282277 | A1 * | 11/2009 | Sedarat et al. ................ | 713/320 |
| 2010/0046543 | A1 * | 2/2010 | Parnaby ........................ | 370/465 |
| 2010/0111081 | A1 * | 5/2010 | Diab ............................ | 370/389 |
| 2010/0115316 | A1 * | 5/2010 | Diab ............................ | 713/323 |
| 2010/0118753 | A1 * | 5/2010 | Mandin et al. ................ | 370/311 |
| 2010/0262851 | A1 * | 10/2010 | Chien ........................... | 713/320 |
| 2010/0329108 | A1 | 12/2010 | Diab et al. | |
| 2011/0022699 | A1 * | 1/2011 | Powell et al. ................. | 709/224 |

OTHER PUBLICATIONS

EP Search Report, Dec. 2012.
Frazier et al., Technical Open Items for LPI, IEEE 802.3az, Mar. 2008.
Korean Intellectual Property Office (KIPO) Office Action, Sep. 24, 2013.
TW Office Action, May 8, 2014.

* cited by examiner

*Primary Examiner* — Vincent Tran
(74) *Attorney, Agent, or Firm* — Duane S. Kobayashi

(57) ABSTRACT

Energy efficient Ethernet with a low power active idle transmission mode. A low power active idle transmission mode is defined for the transmission of idle signals during inter-packet gaps. The low power active idle transmission mode can provide energy savings in those instances that preclude the use of a low power idle mode and/or subrating to produce greater energy savings.

12 Claims, 4 Drawing Sheets

ENERGY EFFICIENCY ETHERNET WITH LOW POWER ACTIVE IDLE TRANSMISSION MODE

BACKGROUND

1. Field of the Invention

The present invention relates generally to energy efficient Ethernet networks and, more particularly, to energy efficient Ethernet with a low power active idle transmission mode.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the utilization of the network link. For example, many network links are typically in an idle state between sporadic bursts of data. During this idle state, idle signals are transmitted. Unfortunately, the transmission of idle signals wastes energy and adds to the radiated emission levels.

While identification of low link utilization periods can provide opportunities to produce energy savings, many traffic profiles can include regular or intermittent low-bandwidth traffic, with bursts of high-bandwidth traffic. Here, identification of a low link utilization period is more difficult and the potential for energy savings is reduced. What is needed therefore is a mechanism that can produce energy savings during active idle signal transmissions.

SUMMARY

An energy efficient Ethernet with a low power active idle transmission mode, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy Efficient Ethernet networks attempt to save power when the traffic utilization of the network is not at its maximum capacity. This serves to minimize the performance impact while maximizing energy savings. At a broad level, the energy efficiency control policy for a particular link in the network determines when to enter an energy saving state, what energy saving state (i.e., level of energy savings) to enter, how long to remain in that energy saving state, what energy saving state to transition to out of the previous energy saving state, etc. In one embodiment, energy efficiency control policies can base these energy-saving decisions on a combination of settings established by an IT manager and the properties of the traffic on the link itself.

Figure 1:
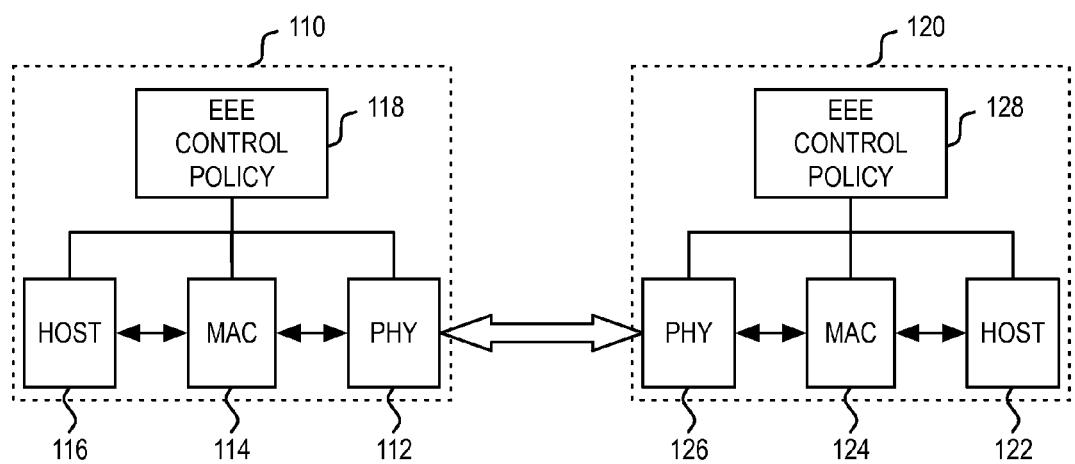
FIG. 1 illustrates an Ethernet link between link partners.

FIG. 1 illustrates an example link to which an energy efficiency control policy can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As illustrated, link partner 110 includes physical layer device (PHY) 112, media access control (MAC) 114, and host 116, while link partner 120 includes PHY 122, MAC 124, and host 126.

In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 114 and 124 may provide the necessary services to hosts 116 and 126 to ensure that packets are suitably formatted and communicated to PHYs 112 and 122, respectively. MAC controllers 114 and 124 may comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

As FIG. 1 further illustrates, link partners 110 and 120 also include energy efficiency control policy entities 118 and 128, respectively. In general, energy efficiency control policy entities 118 and 128 can be designed to determine when to enter an energy saving state, what energy saving state (i.e., level of energy savings) to enter, how long to remain in that energy saving state, what energy saving state to transition to out of the previous energy saving state, etc.

In general, energy efficiency control policy entities 118 and 128 can comprise suitable logic, circuitry, and/or code that may be enabled to establish and/or implement an energy efficiency control policy for the network device. In various embodiments, energy efficiency control policy entities 118 and 128 can be a logical and/or functional block which may, for example, be implemented in one or more layers, including portions of the PHY or enhanced PHY, MAC, switch, controller, or other subsystems in the host, thereby enabling energy-efficiency control at one or more layers.

In one example, energy efficient Ethernet such as that defined by IEEE 802.3az can provide substantial energy savings through the use of a low power idle mode and/or subrating. In general, the low power idle mode can be entered when a transmitter enters a period of silence when there is no data to be sent. More generally, subrating can be used to address low link utilization conditions.

Figure 2:
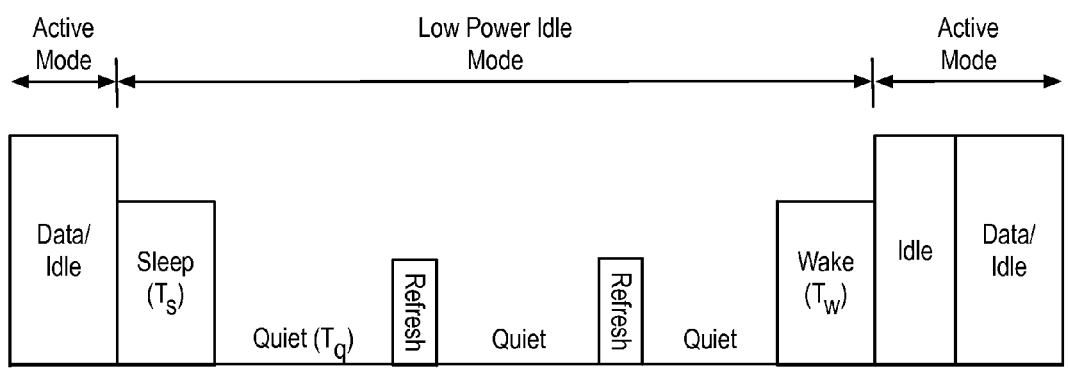
FIG. 2 illustrates transitions between an active mode and a low power idle mode.

FIG. 2 illustrates the transitions between an active mode and a low power idle mode. As illustrated, a transmitter can begin in an active mode where data traffic and idle signals are transmitted. When it is determined by an energy efficiency control policy that the absence of data traffic indicates a sufficiently low link utilization condition, the energy efficiency control policy can then instruct the transmitter to enter into a low power idle mode. A transition from an active mode to the low power idle mode takes a sleep time $T_s$, after which time the transmitter can enter a quiet state. The transmitter can stay quiet for a time $T_q$, after which the transmitter will transmit a refresh signal. In general, refresh signals are sent periodically to keep the link alive and to enable the receiver to maintain synchronization. The transmitter can remain in a quiet state until data traffic is ready to be transmitted. Significant energy savings can be achieved while in the quiet state.

When there is data to transmit, a normal idle signal is used to wake the transmit system up before the data traffic can be sent. As illustrated, the transmitter can take a time $T_w$ to wake up and re-enter the active mode once again for transmission of data traffic that is available.

The low power idle mode enables substantial energy savings. One of the tradeoffs in leveraging the low power idle mode is the overhead represented by the wake time ($T_w$) and the sleep time ($T_s$). These overhead times in transitioning to and from the low power idle mode can take microseconds.

Where the traffic profile is truly burst-like (e.g., link is inactive for 90% or more of the time), the overhead times represented by the wake time ($T_w$) and the sleep time ($T_s$) do not represent a severe penalty. This is the case because the transition times between the active mode and the low power idle mode are a small percentage of the length of time during which the link is inactive.

Some traffic profiles, however, may have inter-packet gaps (IPGs) that are broken up into smaller durations that can be comparable in duration to the transition times represented by the low power idle wake time ($T_w$) and sleep time ($T_s$). The result of this type of traffic profile can be significantly degraded efficiency. This degraded efficiency can result simply because the system is able to enter the low power idle mode much less frequently. Additionally, degraded efficiency can result because the system enters and immediately leaves the low power idle mode without any significant energy savings. As would be appreciated, the entry and exit from the low power idle mode will incur power and performance (e.g., latency) costs.

The level of energy savings gained by the low power idle mode are dependent and highly sensitive to the traffic profile. Unfortunately, the traffic profiles are not known a priori. One potential solution to traffic profiles that have small IPGs is to buffer and batch the data traffic. This potential solution is not ideal, however, because buffering can be expensive. For this and other reasons, industry trends are moving away from such buffering implementations. Even if buffer and batch techniques are available, some traffic profiles cannot be significantly modified because the traffic (e.g., control traffic) cannot be significantly delayed.

Notwithstanding these drawbacks, the low power idle mode can produce significant energy savings in certain low-link utilization conditions. It is therefore a feature of the present invention that the low power idle mode can be complemented by an energy savings mechanism that can be utilized during the active mode. This active-mode mechanism can then be leveraged to produce energy savings on a link even when the traffic profile does not lend itself to energy savings produced by the low power idle mode. As will become apparent by the description below, this complementary energy savings technique would not require a modification of the traffic profile.

In one embodiment, the complementary energy savings mechanism is designed to save energy during the transmission of idle signals during the active mode. As noted above, the energy consumed by the transmission of idle signals during the active mode is similar to the energy consumed by the transmission of data traffic during the active mode. In the present invention, it is recognized that energy savings can be achieved during normal idle signaling by taking advantage of the inherently improved noise and error tolerance during idle signaling in the active mode.

It is a feature of the present invention that a low power active idle signal transmission during an active mode can be defined that is capable of very fast (or zero) transition time between an active data transmission mode and a low power active idle transmission mode. In general, the low power active idle transmission mode can be enabled when the link utilization is less than 100% but greater than the utilization level that would ordinarily trigger a low power idle mode. As such the low power active idle transmission mode would complement the low power idle mode in providing energy savings in those traffic profile instances that would preclude the use of the low power idle mode.

Figure 3:
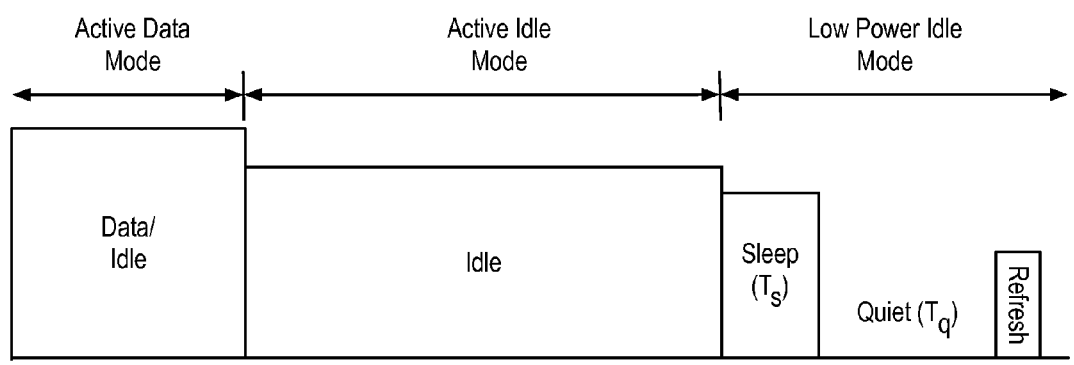
FIG. 3 illustrates transitions between an active data transmission mode and an active idle transmission mode.
Figure 4:
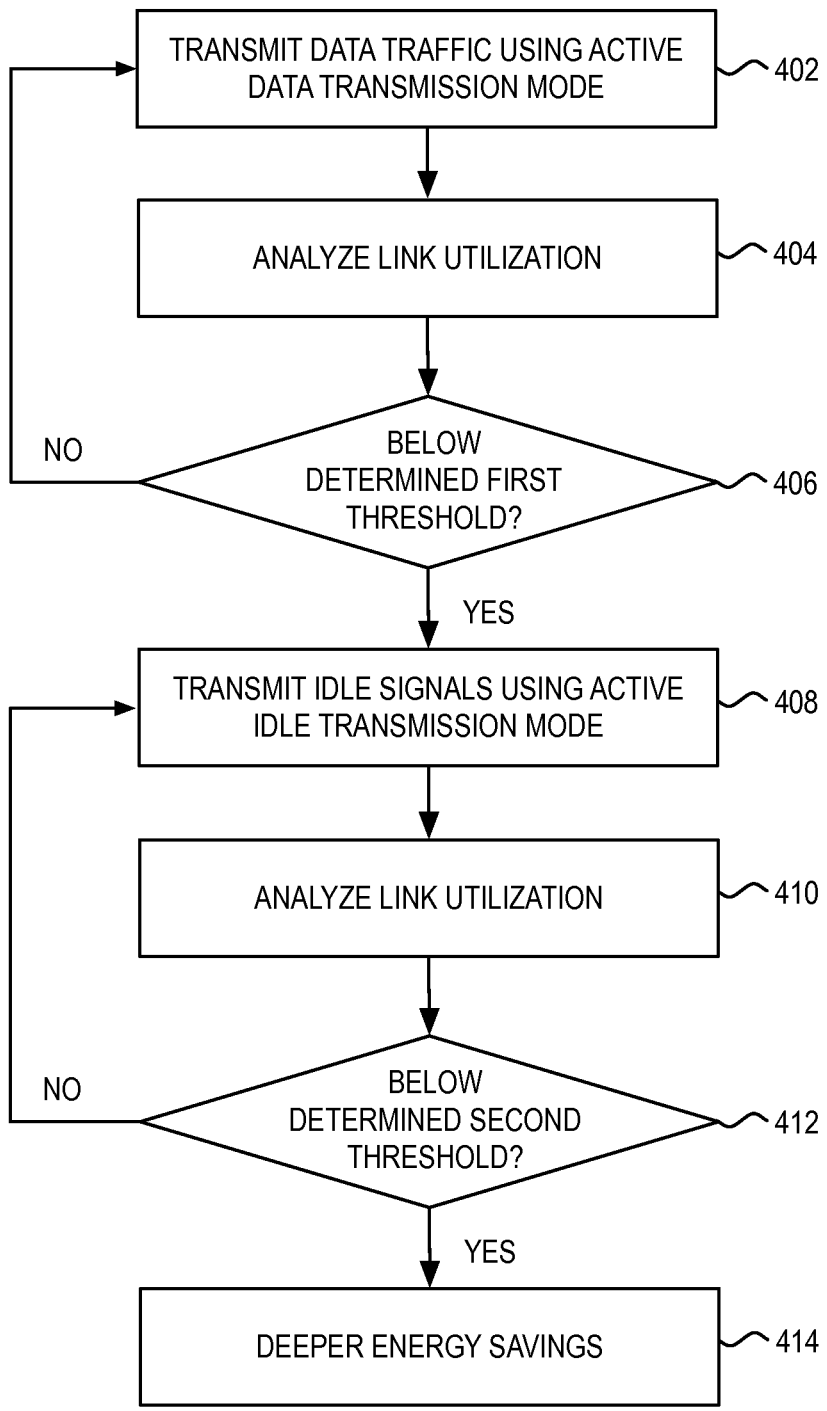
FIG. 4 illustrates a flowchart of a process of the present invention.

FIGS. 3 and 4 illustrate the complementary use of such a low power active idle transmission mode. As illustrated, the process begins at step 402 where a transmitter transmits data traffic and idle signals while in an active data transmission mode. At step 404, the energy efficiency control policy would analyze the link utilization to determine whether the absence of data traffic indicates the potential to achieve energy savings. As idle signals are transmitted and the link utilization level drops, an energy efficiency control policy can determine at step 406 whether the link utilization drops below a determined threshold.

In the present invention it is recognized that multiple thresholds relating to one or more link utilization measures can be used to distinguish between two or more energy savings states. In the example where an active idle transmission mode and a low power idle mode are used as two different energy savings states, a first threshold can be used to identify the applicability of the active idle transmission mode for a first level of energy savings, while a second threshold can be used to identify a deeper level of energy savings represented by the low power idle mode. More generally, it should be noted that the energy efficiency control policy can adjust the one or more thresholds based on the latency requirements of the energy efficiency control policy and the energy efficiency capabilities of the device.

As noted, smaller IPGs may preclude the use of a low power idle mode. In these instances, the link utilization level may be below the first threshold, yet above the second threshold, thereby precluding the entry into the low power idle mode.

If it is determined at step 406 that the link utilization is not below the first threshold, then the transmit system would remain in the active data transmission mode. If, on the other hand, it is determined at step 406 that the link utilization is below the first threshold, then the transmit system would transmit idle signals in an active idle transmission mode at step 408, thereby producing some energy savings. In the example described above, multiple thresholds can be used. For example, a second link utilization analysis can be performed at step 410, followed by a second threshold determination at step 412. Based on the second determination at step 412, a deeper level of energy savings can be entered at step 414.

In one embodiment, the low power active idle transmission mode can use normal idle signaling where certain functions within the physical layer device can be placed in a low power mode. For example, in a 10G physical layer device portions of a pre-emphasis module can be powered off due to the inherently improved noise and error tolerance during the transmission of idle signals in an active mode. In another embodiment, the low power active idle transmission mode can be based on a different signal constellation. For example, a gigabit Ethernet transmitter can transition from PAM-5 modulation for the transmission of data traffic, to the more impairment-tolerant PAM-3 modulation for the transmission of idle signals. Here, some performance degradation would be acceptable because idle signals are inherently more tolerant of performance degradation and. Additionally, bit errors are not as critical. More generally, the low power active idle transmission mode can take advantage of the fact that reduced performance is acceptable.

As noted, the low power active idle transmission mode can be defined such that little to no transition times would be required. As such, the low power active idle transmission mode would be suitable for use in those instances where the IPGs are short in duration and the low power idle mode would not apply. As illustrated in FIG. 3, the low power active idle mode can be used up until the point in time that the energy efficiency control policy indicates that the low power idle mode can be entered. At that point in time, deeper energy savings can be achieved through the low power idle mode.

It should be noted that transitions between the active data transmission mode, active idle transmission mode, and low power idle mode need not be strictly sequential. For example, the energy efficiency policy can be designed to transition from the active data transmission mode directly to the low power idle mode, thereby bypassing the active idle transmission mode. This scenario can result, for example, where the low power idle mode is preferred and entry into the active idle transmission mode is dependent on a failure to enter into the low power idle mode.

In the present invention it is recognized that the particular relationship between the active idle transmission mode and the low power idle mode would be implementation dependent. What is significant is that the active idle transmission mode can be called upon to produce energy savings in instances that would preclude the application of the low power idle mode. It is also significant that the usage of the lower power active idle transmission mode need not be dependent on the link partner.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficiency method in a physical layer device, comprising:

transmitting data traffic using an active data transmission mode of the physical layer device;

determining whether a level of link utilization drops below a first threshold;

transitioning to an active idle transmission mode when it is determined that the level of link utilization drops below the first threshold, wherein the active idle transmission mode modifies one or more functions of a transmission subsystem to consume less power than the active data transmission mode when transmitting active idle signals, the physical layer device being configured to transition from the active idle transmission mode back to the active data transmission mode whenever there is data traffic to transmit by the physical layer device;

determining whether the level of link utilization drops below a second threshold different from the first threshold; and transitioning to a low power idle mode when it is determined that the level of link utilization drops below the second threshold, the low power idle mode conserving energy through a deactivation of transmitter or receiver components in the physical layer device.

2. The method of claim 1, further comprising transitioning from the active idle transmission mode to the active data transmission mode when data traffic is ready for transmission.

3. The method of claim 1, wherein the transitioning to the active idle transmission mode comprises modifying a signal constellation used by the transmission subsystem.

4. The method of claim 1, wherein the transitioning to the active idle transmission mode comprises powering down a pre-emphasis module in the transmission subsystem.

5. The method of claim 1, wherein the transitioning to the low power idle mode comprises transitioning from the active data transmission mode to the low power idle mode.

6. The method of claim 1, wherein the transitioning to the low power idle mode comprises transitioning from the active idle transmission mode to the low power idle mode.

7. The method of claim 1, further comprising transmitting refresh signals during the low power idle mode.

8. An energy efficient physical layer device, comprising:

a transceiver, the transceiver having one or more components that are turned off during a low power idle mode of the physical layer device, the low power idle mode of the physical layer device including sleep, quiet, refresh and wake states; and a controller that controls an operation of the transceiver while in an active data transmission mode for a communication of data traffic and idle signals, the controller being configured to transition the transceiver from an active data transmission mode used for the transmission of data traffic to an active idle transmission mode, wherein the transition to the active idle transmission mode is based on a determination that the level of link utilization drops below a threshold value, and modifies one or more functions of a transmission subsystem to consume less power that the active data transmission mode when transmitting active idle signals, the controller being further configured to transition the physical layer device from the active idle transmission mode back to the active data transmission mode whenever there is data traffic to transmit by the physical layer device.

9. The device of claim 8, wherein the active idle transmission mode uses a different signal constellation than the active data transmission mode.

10. The device of claim 8, wherein the transition to the active idle transmission mode is from the active data transmission mode.

11. The device of claim 8, wherein one or more parts of the transceiver are switched off when in the active idle transmission mode.

12. The device of claim 11, wherein the one or more parts of the transceiver is a pre-emphasis module.

* * * * *